(12) United States Patent
Gilbao et al.

(10) Patent No.: US 9,367,421 B2
(45) Date of Patent: Jun. 14, 2016

(54) SYSTEMS, METHODS, AND COMPUTER PROGRAMS PRODUCTS PROVIDING RELEVANT CORRELATION OF DATA SOURCE PERFORMANCE

(71) Applicant: NetApp, Inc., Sunnyvale, CA (US)

(72) Inventors: Ran Gilbao, Waltham, MA (US);
Aashay Joshi, Waltham, MA (US);
Alberto Velella, Waltham, MA (US);
Yarom Gabay, Waltham, MA (US);
Jason Sprague, Waltham, MA (US)

(73) Assignee: NETAPP, INC., Sunnyvale, CA (US)

( * ) Notice: Subject to any disclaimer, the term of this patent is extended or adjusted under 35 U.S.C. 154(b) by 121 days.

(21) Appl. No.: 14/198,332

(22) Filed: Mar. 5, 2014

(65) Prior Publication Data

US 2015/0178176 A1 Jun. 25, 2015

Related U.S. Application Data

(60) Provisional application No. 61/919,487, filed on Dec. 20, 2013.

(51) Int. Cl.
| | | |
|---|---|---|
| *G06F 11/00* | (2006.01) | |
| *G06F 11/32* | (2006.01) | |
| *G06F 9/445* | (2006.01) | |

(Continued)

(52) U.S. Cl.
CPC ............... *G06F 11/328* (2013.01); *G06F 8/65* (2013.01); *G06F 11/0793* (2013.01); *G06F 11/2028* (2013.01); *G06F 11/3006* (2013.01); *G06F 11/3452* (2013.01); *G06Q 30/0631* (2013.01); *H04L 41/147* (2013.01); *H04L 41/22* (2013.01); *H04L 43/00* (2013.01); *H04L 43/04* (2013.01); *H04L 43/045* (2013.01);

(Continued)

(58) Field of Classification Search
CPC ............ G06F 11/0793; G06F 11/2028; G06F 11/2006; G06F 11/3452; H04L 12/2424; H04L 43/00; H04L 43/04
See application file for complete search history.

(56) References Cited

U.S. PATENT DOCUMENTS

| | | |
|---|---|---|
| 6,694,288 B2 | 2/2004 | Smocha et al. |
| 7,509,229 B1 | 3/2009 | Wen |

(Continued)

OTHER PUBLICATIONS

Hoffman C., What Is a Virtual Machine?, [Retrieved from the Internet] [Online] Jul. 18, 2012, 6 pages.

(Continued)

*Primary Examiner* — Joshua P Lottich
(74) *Attorney, Agent, or Firm* — Klein, O'Neill & Singh, LLP

(57) ABSTRACT

A method performed by a monitoring tool in a computer system, the method including: for a set of network nodes in a computer system: applying a correlation formula on an input based on performance data of the set, and determining a correlation score based on applying the correlation formula, the correlation score indicating a correlation between network nodes in the set; determining, based on the correlation scores, a first list including a first plurality of network nodes having a correlation score that satisfies a first threshold; identifying a second plurality of network nodes included in the first list, the second plurality of network nodes having a correlation score that satisfies a second threshold, which indicates a correlation that is higher than the first threshold; analyzing the performance data of the second plurality against a constancy metric; and removing, based on the analyzing, the second plurality from the first list.

20 Claims, 4 Drawing Sheets

(51) Int. Cl.

| | | |
|---|---|---|
| *H04L 12/26* | (2006.01) | |
| *G06F 11/07* | (2006.01) | |
| *G06F 11/20* | (2006.01) | |
| *G06F 11/30* | (2006.01) | |
| *G06F 11/34* | (2006.01) | |
| *H04L 12/24* | (2006.01) | |
| *H04L 29/08* | (2006.01) | |
| *G06Q 30/06* | (2012.01) | |

(52) U.S. Cl.
CPC ......... *H04L 43/065* (2013.01); *H04L 43/0894* (2013.01); *H04L 67/34* (2013.01); *H04L 67/36* (2013.01)

(56) References Cited

U.S. PATENT DOCUMENTS

| | | |
|---|---|---|
| 7,703,091 B1 | 4/2010 | Martin et al. |
| 7,752,301 B1 | 7/2010 | Maiocco et al. |
| 7,844,701 B2 | 11/2010 | Ramany et al. |
| 8,176,483 B2 | 5/2012 | Hoefler et al. |
| 8,381,208 B2 | 2/2013 | Burke et al. |
| 8,813,063 B2 | 8/2014 | Uthe |
| 2002/0049687 A1 | 4/2002 | Helsper et al. |
| 2004/0243636 A1 | 12/2004 | Hasiewicz et al. |
| 2004/0267718 A1 | 12/2004 | Milligan et al. |
| 2007/0027985 A1 | 2/2007 | Ramany et al. |
| 2007/0124465 A1 | 5/2007 | Malloy et al. |
| 2008/0141240 A1 | 6/2008 | Uthe |
| 2009/0281923 A1 | 11/2009 | Selinger et al. |
| 2010/0198845 A1 | 8/2010 | Kutsch et al. |
| 2010/0318986 A1 | 12/2010 | Burke et al. |
| 2011/0208855 A1 | 8/2011 | Robertson et al. |
| 2013/0031414 A1* | 1/2013 | Dhuse ................. G06F 11/0727 714/37 |
| 2013/0343213 A1* | 12/2013 | Reynolds ............. H04L 43/045 370/252 |
| 2013/0346841 A1* | 12/2013 | Ahmed ................... H04L 67/22 715/208 |
| 2014/0280894 A1* | 9/2014 | Reynolds ............. H04L 41/142 709/224 |
| 2015/0067143 A1* | 3/2015 | Babakhan ............. G06F 11/301 709/224 |
| 2015/0312283 A1* | 10/2015 | Edwards ............. H04L 65/1069 370/252 |

OTHER PUBLICATIONS

Non-Final Office Action mailed Aug. 27, 2015 for U.S. Appl. No. 14/310,979, filed Jun. 20, 2014, 22 pages.
Non-Final Office Action mailed Nov. 20, 2015 for U.S. Appl. No. 14/198,302, filed Mar. 5, 2014, 17 pages.
Non-Final Office Action mailed Feb. 2, 2016 for U.S. Appl. No. 14/310,994, filed Jun. 20, 2014, 16 pages.
Non-Final Office Action mailed Feb. 26, 2016 for U.S. Appl. No. 14/311,011, filed Jun. 20, 2014, 25 pages.
Final Office Action mailed Mar. 15, 2016 for U.S. Appl. No. 14/310,979, filed Jun. 20, 2014, 31 pages.

\* cited by examiner

US 9,367,421 B2

SYSTEMS, METHODS, AND COMPUTER PROGRAMS PRODUCTS PROVIDING RELEVANT CORRELATION OF DATA SOURCE PERFORMANCE

CROSS REFERENCE TO RELATED APPLICATIONS

The present application claims the benefit of U.S. Provisional Patent Application No. 61/919,487, filed Dec. 20, 2013, and entitled "System, method, and computer program product for monitoring infrastructure and assets," the disclosure of which is incorporated by reference herein in its entirety.

TECHNICAL FIELD

The present disclosure relates generally to computing system monitoring and, more particularly, to the correlation of topologically related network nodes in computing systems.

BACKGROUND

Information storage systems may include a variety of different hardware and software components. For instance, a storage system may include one or more storage controllers, where each of the storage controllers provides the low-level control for a plurality of physical storage drives. The storage system may also include network connections and other items that are ancillary to the storage functionality of the system. Storage systems continue to become more and more complex, with storage controllers hosting an increasing number of logical storage volumes and storage controllers being clustered rather than simply standing alone. There is currently a need for a management application that monitors assets of storage systems in an efficient and intuitive manner.

A human user acting as an administrator for a storage system may have to investigate errors or other undesirable performance issues from time to time. Conventional monitoring and management applications exist that allow the administrator to view the performance of a particular system asset, usually by examining performance data logs. However, current monitoring and management applications rely on the skills and knowledge of the administrator to understand whether performance of one system asset affects the performance of another system asset. For instance, undesirable performance of a network interface card at a storage controller may affect the latency of a storage volume, and the administrator would be expected to know the interrelationships of the different storage assets and to trouble shoot perceived problems at one storage asset by looking to related storage assets. Nevertheless, current monitoring and management applications do not provide much or any assistance in identifying important relationships among performance of storage assets.

DETAILED DESCRIPTION

Figure 1:
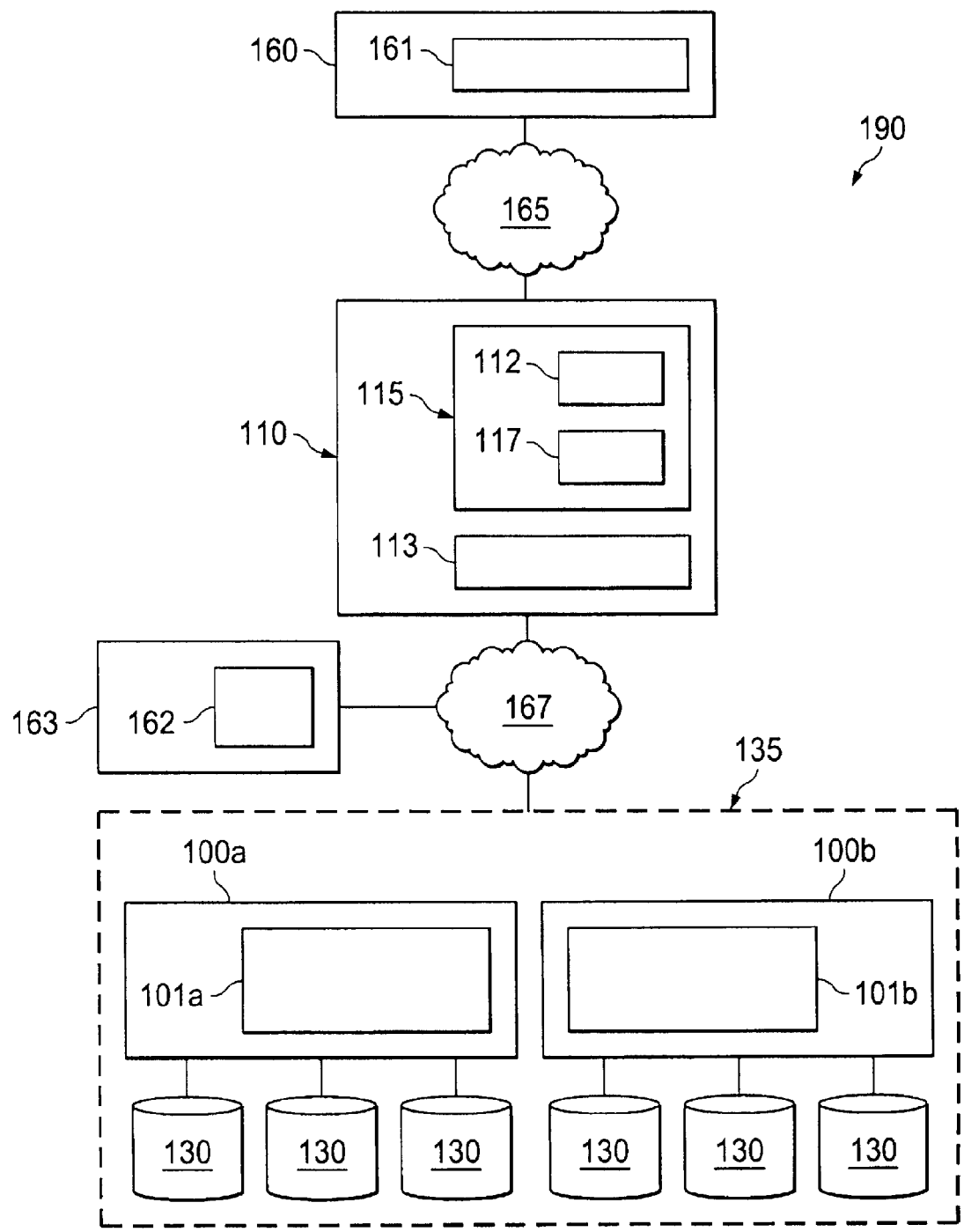
FIG. 1 is a simplified diagram of an example computing system according to one embodiment.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments of the present disclosure provide monitoring of a computer system that is both efficient and easy to understand for a human user. One embodiment includes the application of a correlation formula to a variety of different and related network nodes. This type of information may be useful to an administrator to analyze the network, as described in more detail below.

In a system with a variety of different network nodes, the performance of a given network node may be related to the performance of another network node. One example would be the I/O Operations per Second (IOPS) of an application and the IOPS of a virtual storage volume used by that application. Statistical correlation may be used to calculate a number that scores the relationship. An example of a statistical correlation formula that may be used by some embodiments includes calculating the Pearson's population correlation coefficients. The population correlation coefficient $\rho_{X,Y}$ between two random variables X and Y with expected values $\mu_X$ and $\mu_Y$ and standard deviations $\sigma_X$ and $\sigma_Y$ is defined as:

$$\rho_{X,Y} = \mathrm{corr}(X, Y) = \frac{\mathrm{cov}(X, Y)}{\sigma_X \sigma_Y} = \frac{E[(X - \mu_X)(Y - \mu_Y)]}{\sigma_X \sigma_Y},$$

where E is the expected value operator, coy means covariance, and, corr a widely used alternative notation for the correlation coefficient. So in one example, a monitoring tool may calculate a correlation score for IOPS of an application and IOPS of a virtual volume used by that application. Of course, an application and a virtual volume are only two examples of nodes that may be performance-related, and IOPS is just one example of a performance metric that may be correlated between two different nodes. Other examples are given below.

Correlation scores may be quite useful to an administrator of a system. Typically, the higher a correlation score between performance metrics of two different nodes, the more related the performance is between those two different nodes. Thus, high correlation may indicate that performance problems of one node are related to performance problems of another node. Therefore, if an administrator had for a given node comprehensive correlation data between that node and other nodes (e.g., for ten other nodes, ten correlation scores indicating a relationship between the given node and the respective other node) that administrator could use that information for system troubleshooting. For instance, an unexpectedly high correlation score for one of the other nodes may indicate to the administrator to look to the other node to investigate a performance issue, when the administrator would not have looked to the other node otherwise.

In a computer system with tens or hundreds of nodes, correlating each node with each other node may be unworkable. Also, correlating each node with each other node may generate mostly irrelevant information. For instance, within a given system some nodes may be so unrelated that correlating their performance metrics may not provide much value. Also, some correlation scores may be so low, or even misleading, that their inclusion in user-presented information may be less than helpful.

Therefore, various embodiments provide enhanced techniques for providing correlation scores for nodes in a computer system. For instance, some embodiments include logic to determine communicative relationships among various nodes. For example, the monitoring tool may extract data from switches and storage controllers regarding configured ports and volumes as well as directed traffic. The logic then uses this information to determine that a given Virtual Machine (VM) accesses particular volumes through particular switches, and the like. Thus, the logic can derive topology information from the extracted configuration and communication data. The monitoring tool can then use the topology information to decide which devices to correlate. For instance, when calculating correlations for the VM, the monitoring tool knows to omit calculating correlations for volumes which the VM does not access and switch ports which the VM does not use.

In another example, the monitoring tool limits a list of correlation values by applying a threshold. For instance, correlation values below a certain level (such as 15%) may be omitted. Of course, any appropriate thresholds may be set, as 15% is merely an example. Also, some correlations may be very high, nearly 100%, but indicative of nothing valuable. For instance, when two nodes have nearly zero activity for a period of time, they may show very high correlation during that period of time even if they have no real relationship. Thus, in various embodiments the monitoring tool double checks very high correlation scores by going back to raw data and eliminating scores that appear to be the result of constancy in performance.

The example of FIG. 1 below is directed to a network storage system, and the scope of embodiments is applicable to a wide variety of computer systems other than storage systems. Accordingly, the concepts described herein for monitoring and analyzing system data may be applied to computing systems generally.

FIG. 1 is an illustration of a network storage system 190 adapted according to one embodiment. Various embodiments of the present disclosure may be implemented by the network storage system 190, as described in more detail below.

The system 190 includes server system 110 connected to server system 163 and client system 160 via a network 165. The system 190 also includes server system 163 connected to server system 110 and client system 160 via a network 167.

Network 165, 167 may be any kind of network including a local area network (LAN), such as an Ethernet, and/or a wide area network (WAN), such as the internet. In some examples, server 110 and/or 163 may be a standalone workstation, a cluster, a production server, within a virtual machine, and/or the like. The servers include a processor coupled to memory. In some examples, a processor may control operation and/or execution of hardware and/or software on the server. The server may include multiple processors, CPUs, multi-core processors, field programmable gate arrays (FPGAs), application specific integrated circuits (ASICs), and/or the like. Memory may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

A server system may access storage subsystems 100 that are connected to the server system via a network 167. The storage subsystems 100 are included in a cluster 135. Each storage system 100 in the cluster 135 includes a set of storage devices 130 for storing client data, the storage devices 130 of the cluster 135 providing the shared storage of the storage system 100. Each storage subsystem 100 also includes a storage controller 101. Each storage controller 101 exercises low-level control over physical storage devices 130 to provide virtualized storage to the server system(s) and client 160. Examples of storage hardware that can be used as physical storage devices 130 includes, e.g., hard disk drives and solid state drives, though the scope of embodiments is not limited to any particular storage hardware.

Each storage device 130 may store data from logical storage entities such as one or more storage volumes, where each volume has a file system implemented on the volume. A file system implemented on the logical storage entity may provide multiple directories in a single volume, each directory containing various filenames each of which may be mapped to a multitude of storage devices 130.

Client system 160 may run one or more applications (e.g., word processing or database programs, typified by application 161) that utilize the storage system. Client system 160 includes a computer system that interacts with server system 110 for submitting read/write access requests and for receiving or transmitting data from or to the server system 110 over the network 165. In a virtual server environment, application 161 on client system 160 may interact over the network 165 with one or more virtual machines (VMs) 115 executing on server system 110 and application 161 on client system 160 may interact over the network 165, 167 with one or more virtual machines (VMs) 162 executing on server system 163. Application 161 may be, for example, a database or email server.

As mentioned above, various embodiments include a system monitoring tool that determines a correlation between network nodes in a computer system. An embodiment may provide an administrator with an easy mechanism to look at different components of the computer system and determine which network nodes in the computer system have related behavior. The administrator may be able to perform troubleshooting on the network with more ease. A network node, for example, may include any system asset such as a virtual volume, storage drive, storage controller, server, host machine, virtual machine, application and/or the like.

System 190 includes a system monitoring tool that is implemented as an application. For instance, a system monitoring tool can be implemented as application 161 at client 160. Additionally or alternatively, the system monitoring tool may be implemented as one of applications 112, 117. For the purposes of this example, application 117 is described as the system monitoring tool. The system monitoring tool 117 receives system data by communicating with storage operating systems at each storage controller 101. For instance, system monitoring tool 117 may communicate via API to receive system information, such as hardware names, volume names, usage data, read and write operations per second, and the like. Various types of system information are described in more detail below. In short, the system information of this example includes any type of information that allows the monitoring tool 117 to construct a comprehensive description of the architecture and performance of system 190.

Server system 110 includes a computer system that executes applications and interacts with the client system 160 for receiving read/write access requests and receiving or transmitting data from or to the client system 160 over the network 165. Server system 110 in this example is connected to the client system 160 over a network 165 such as a local area network (LAN), an Ethernet subnet, a PCI or PCIe subnet, a switched PCIe subnet, a wide area network (WAN), a metropolitan area network (MAN), the Internet, or the like.

The server 110 may include any appropriate computer hardware and software. In one example, server 110 includes a general-purpose computer configured to execute any of a variety of operating systems, including the Unix™, Linux™, and Microsoft Windows™ operating systems.

Server system 110 includes hypervisor 113, which creates and manages one or more Virtual Machines (VMs)—in this case, VM 115. The present example shows only a single VM 115, though in other embodiments, the server 110 includes multiple VMs (not shown), each VM being used by and connected with a client 160 through computer network 165. Thus, systems with more than one client 160 may include more than one VM 115, each client being supported by at least one VM. VM 115 includes an encapsulation or instance of an operating system and applications 112 and 117 executing on top of that instance. Briefly, application 112 provides read/write access to the clients 160 to data stored in cluster 135. Application 117 is a system monitoring tool described in more detail below. In some embodiments, different types of VM hypervisors 113 may be used (e.g., VMware™ ESX, Microsoft™ Hyper-V, etc.).

Each storage system 100 is configured to allow server 110 to access its data, for example, to read or write data to the storage system. The server 110 executes application 112 that "connects" to storage systems 100 over computer network 167 to send an access request (read or write request) to storage system 100 for accessing particular data stored on the storage system 100. The VM application 112 executing on the server 110 services the connected client 160 by receiving the client access requests and submitting the access requests to the storage system 100 for execution.

The scope of embodiments is not limited to the particular architecture of system 190. For instance, other systems may include additional servers, each server being similar to server 110. While the example of FIG. 1 shows only one client 160, it is understood that any appropriate number of clients may be supported by the system 190. Moreover, while cluster 135 shows two storage subsystems 100a and 100b, it is understood that any appropriate number of controllers and storage drive arrays may be used with various embodiments. For instance, some embodiments may include only a single storage subsystem, whereas other embodiments may include three or more storage subsystems. In other words, the scope of embodiments is not limited to a single storage cluster.

System monitoring tool 117 monitors the network nodes of system 190, where the network nodes include any hardware or software component that is included in the architecture of system 190 or affects the performance of the system 190. Examples of network nodes include the underlying storage drives (e.g., HDDs and SSDs), virtual volumes, storage controllers, storage subsystems, aggregates of storage subsystems, network connections, virtual machines, hypervisors, applications, and the like.

System monitoring tool 117 includes the ability to determine communicative and architectural relationships among the different nodes in the system. For instance, monitoring tool 117 includes a discovery function that uses communication protocols defined by Application Programming Interfaces (APIs) to communicate with the nodes to receive data regarding the nodes. Monitoring tool 117 receives a variety of information types including, but not limited to, hardware and software counter raw data, configuration data for switch ports, volumes, and the like, and network communication data. Monitoring tool 117 then builds an architectural and topological understanding of the system by examining the received data. For instance, in one embodiment monitoring tool 117 assumes that nodes that communicate with each other are related. Thus, when a VM reads and writes to a specific virtual volume through a specific switch port, monitoring tool 117 is aware of this communication relationship by its collected configuration data and network communication data. Monitoring tool 117 creates a data structure (not shown, for instance in RAM or in nonvolatile memory at server 110) that stores the communication relationships and consults the communication relationships when performing correlation calculations.

Put another way, monitoring tool 117 identifies which network nodes communicate with each other by, for example, identifying different paths and accesses between network nodes. Network nodes that communicate with each other are considered related. In an example, VM 162 may access a particular virtual volume and system monitoring tool 117 may determine that VM 162 is related to the virtual volume by observing network traffic and configuration data. Some network nodes in the computer system may not be related to each other. In an example, a fiber channel port at one storage controller may be unrelated to another fiber channel port at a different storage controller because they do not communicate with each other. In such an example, system monitoring tool 117 may understand that these two network nodes are unrelated and thus not attempt to perform correlation calculations between the two.

Application 117 is a system monitoring application that provides for data collection and analysis of correlation aspects of system 190, and may provide for display of the correlation aspects of system 190. As explained above with respect to FIG. 1, tool 117 may be run in a VM in a storage server; additionally or alternatively, a performance management tool may be embodied as an application run on a client (not shown) or on any appropriate computer in communication with cluster 135.

Storage Operating Systems (OSs) run on storage controllers 100. The scope of embodiments may include any appropriate storage OS that provides low-level control to implement virtual storage on storage drives. Storage OS instances run on one or more processors at storage controllers 100. Also, communication between storage OSs and system monitoring tool 117 go through communication links, such as network 167.

Figure 2:
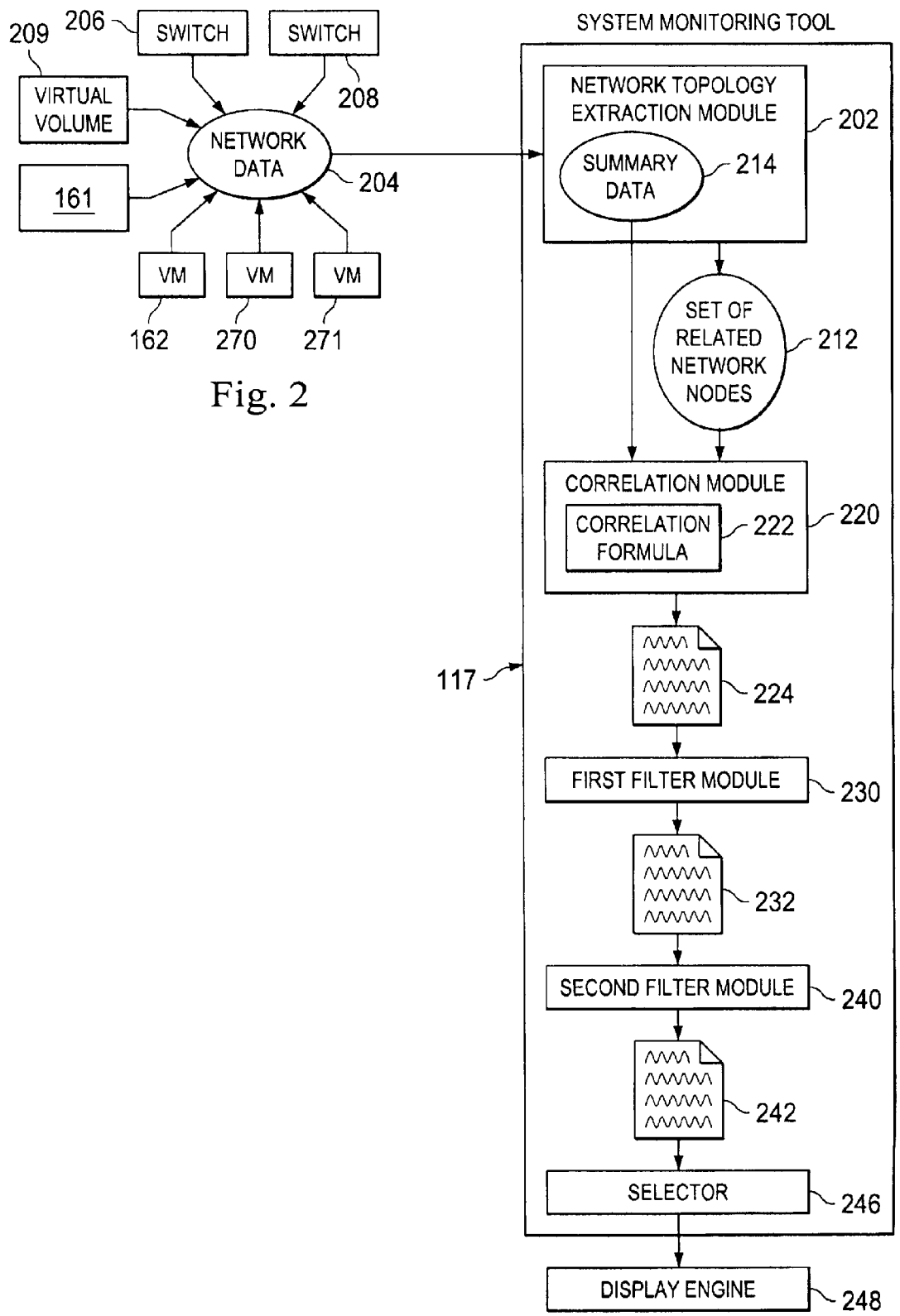
FIG. 2 is a simplified block diagram of a system monitoring tool according to one embodiment.

FIG. 2 is a simplified block diagram of system monitoring tool 117 according to one embodiment. System monitoring tool 117 includes a network topology extraction module 202 that receives network data 204. In an embodiment, network topology extraction module 202 automatically imports information on the various infrastructure network nodes in system 190, providing accurate and real-time visibility of servers, virtual servers, Host Bus Adaptors (HBAs), switches, storage arrays, and the like. In one example, network topology extraction module 202 discovers the network nodes by polling each of the network nodes that it is aware of. Each of the deployed network nodes may provide one or more APIs that can be used to request information therefrom. Network topology extraction module 202 is programmed to use those APIs to automatically import the information. Imported information can include, but is not limited to, device type, latency, operations per second, faults, and the like. In another example, network topology extraction module 202 writes to an API exposed by a network node to instruct it to push updated information to the system monitoring tool 117. The scope of embodiments is not limited to any particular network node information, and any appropriate network node information may be imported in various embodiments.

Network topology extraction module 202 processes network data 204 received from a set of network nodes in the computer system and implements business logic to sort the network data 204. In an example, switches 206 and 208 may send network data to network topology extraction module 202. Switch 206 sees one part of the network, and switch 208 sees another part of the network. Network topology extraction module 202 may then analyze the received data to determine a network topology of the computer system, as described above with respect to FIG. 1. The network topology may be useful in determining which network nodes communicate with each other and are related. For example, network topology extraction module 202 may be able to determine that VM 162 accesses virtual volume 209.

Network topology extraction module 202 analyzes the network data 204 and determines sets of related network nodes 212. A set of related network nodes 212 includes network nodes that are related to each other, e.g., by communicating with each other, by being physically or logically integral, and/or the like. In an example, network topology extraction module 202 determines that application 161 on client system 160 interacts over the network 165 with VM 162 and switch 206. In such an example, network topology extraction module 202 may determine that application 161, client system 160, VM 162, and switch 206 are related network nodes because they have directly or indirectly communicated with each other within a given time period.

A network node sends raw data based on one or more operations at the network node. A network node may maintain its own native performance counter, which may be a software or hardware counter based on one or more operations at the network node. A network node that maintains a native performance counter may be referred to as a native counter network node. Network data 204 may come in many forms. In an example, a network node's native performance counter may count one or more operations at the network node (e.g., one or more input/output (I/O) operations, I/O Operations per second (IOPS), total maximum IOPS, or average IOPS) as well as other performance data (e.g., latencies based on one or more I/O operations).

A network node that does not maintain a native performance counter may be referred to as a non-native counter network node. The non-native counter network node may be the node of interest, and it may be difficult to determine which network nodes have a high correlation to the node of interest because it does not maintain a native performance counter that is useable as an input into the correlation formula. Embodiments may provide a solution to this problem by using the configuration and network topology data to identify network nodes that are closely related to the non-native counter network node. In an example, the non-native counter network node is composed of the closely related network nodes. Correlation information for the closely related network nodes may be used as a proxy for correlation information of the non-native counter network node as described in more detail below.

Network topology extraction module 202 receives network data 204 and determines the configuration and network topology of the computer system based on the network data 204. In an example, one of more servers hosts VMs 162, 270, and 271, and application 161 runs on top of these three VMs. Each of VMs 162, 270, and 271 maintains a native performance counter. No useful statistics may be available from the application 161 itself because it does not maintain any native performance counters that are "useful". It may be desirable to know the correlation between application 161 and another network node such as virtual volume 209, which is accessed by application 161. In such an example, network topology extraction module 202 determines that application 161 runs on top of VMs 162, 270, and 271 and thus that these three VMs are closely related to application 161.

Network data 204 may be received in many forms by network topology extraction module 202. For example, network data 204 may include data from different data sources, different types of data sources, and/or data sources provided by different vendors. In such an example, switches 206 and 208 may be from different vendors, and each of these switches may send network data in raw form that is different from the other. The raw data may include native performance counters maintained by a network node. Network topology extraction module 202 stores and manipulates the raw data to make it more useable (e.g., remove noise). In an example, network data 204 includes too much data for network topology extraction module 202 to practically process within a given time period. To reduce processing time, network topology extraction module 202 samples the raw data and generates summary data 214 that derives from the raw data for network nodes. Summary data 214 is data that is in a more useful form compared to the raw form. In an example, virtual volume 209 records its behavior and sends it to system monitoring tool 117 in raw form. Network topology extraction module 202 may take samples of the raw data hourly and produce an hourly summary of the virtual volume's behavior by producing totals, averages, and other processed information. In such an example, summary data 214 may include the sampled data of the virtual volume's behavior.

System monitoring tool 117 is programmed to know which performance metrics are useful to determine the correlation between particular network nodes, and performance metrics vary from device to device. Example performance metrics of a network node include CPU cycles, IOPS latency, port traffic (network traffic may map to latencies in a VM), average IOPS, and maximum IOPS. A performance metric that is useful to determine such a correlation between application 161 and virtual volume 209 nodes is IOPS. As discussed, application 161 does not maintain a native performance counter. In keeping with the above example of VMs 162, 270, and 271 being closely related to application 161, network topology extraction module 202 may receive IOPS data from virtual volume 209 and VMs 161, 270, and 271 and process this data into more useful information (e.g., by averaging it over time or performing other smoothing operations), thereby generating summary data 214. Summary data 214 may include the network nodes' performance metrics that are useful to determine the correlation of a network node of interest to other network nodes in the computer system.

Correlation module 220 is preprogrammed with information to indicate which performance metrics of different types of network nodes provide valuable correlation information. For example, the performance metrics to apply to a correlation calculation between a VM and a particular storage pool (e.g., virtual volume 209) may include the VM's latency and I/O and the virtual volume's utilization or storage drive IOPS. Another set of performance metrics that may be valuably related includes traffic (in GB/second) at a port and latency (in milliseconds) of a VM. Module 220 may be pre-programmed with a priori knowledge of valuable relationships between performance metrics so that it applies the correlation formula to the pairs of performance data that are most valuable.

Another example of performance metrics that tend to provide valuable correlation data include the same metric applied to different nodes. For example, the maximum IOPS of one network node and the maximum IOPS of another network node may produce valuable correlation information. In another example, the average IOPS of one network node and the average IOPS of another network node may produce valuable correlation information. Another example of performance metrics that tend to provide valuable correlation data include different metrics applied to different nodes. For example, the maximum IOPS of one network node and the average IOPS of another network node may produce valuable correlation information. In any event, module 220 may be pre-programmed with tables of appropriate matches between performance metrics. Module 220 then accesses the table to apply formula 220 to appropriate performance metrics.

Correlation module 220 may obtain set of related network nodes 212 and summary data 214 from network topology extraction module 202. In an embodiment, for a set of network nodes in the computer system, correlation module 220 applies a correlation formula 222 on an input based on performance data of the set of network nodes and determines a correlation score based on applying correlation formula 222. For a given node of interest and a plurality of its related nodes, module 220 calculates a correlation score for each related node with respect to the node of interest. An example of a correlation formula for use in some embodiments is the Pearson equation formula above. Correlation module 220 applies correlation formula 222 to the performance data of the network nodes to calculate correlation scores for each of the network nodes for relevant performance metrics. Each of the correlation scores indicates a correlation of performance data between two network nodes of the plurality of topologically related network nodes.

In an example, if the set of network nodes includes a first network node and a second network node, applying the correlation formula 222 on the first and second network nodes determines a performance correlation between the first network node and the second network node. In such an example, the first network node may be of a first type and the second network node may be of a second type. Applying the correlation formula 222 may include applying a first performance metric for the first network node of the first type and applying a second performance metric for the second network node of the second type. The first and second performance metrics may be the same or different from each other. A performance metric may include at least one of a central processing unit (CPU) counter, I/O operations counter, port traffic, average I/O operations, and maximum I/O operations. Various examples were given above of performance metrics that are usually assumed to be related enough that a correlation score between the two would be valuable. Additionally, the first network node may be from a different vendor than the second network node.

Correlation module 220 may obtain summary data 214 as an input. Summary data 214 is an input of correlation formula 222. Various embodiments may use any correlation formula appropriate for the resources. For instance, a conventional statistical correlation formula, such as the Pearson formula (given above), may be used to correlate performance metric numbers over the time period of interest. For a given node of interest, correlation module 220 may apply the correlation formula to its known related nodes to generate correlation scores between the node of interest and its known related nodes. In one example, correlation module 220 applies the correlation formula 222 for at least a subset of latency, IOPS, throughput, I/O throughput, CPU usage, and memory usage to generate correlation coefficients for appropriate performance metrics. Of course and as noted above, module 220 is pre-programmed to select performance metrics of the related nodes that are appropriate for correlation.

Correlation module 220 may also obtain the set of related network nodes 212 as an input. A network system may have hundreds of network nodes, and to reduce the processing power required to apply the correlation formula 222 correlation module 220 may apply the correlation formula 222 to the set of related network nodes 212 for a given node of interest. Each node in the network may include its own set of related nodes 212, and module 220 would apply correlation formula 222 to those related nodes (and omit generating correlation calculations for unrelated nodes) when generating correlation scores for the node of interest. For example, for a given node of interest that has ten related nodes, module 220 would generate correlation scores between the node of interest and each of the respective related nodes for any appropriate relatable performance metrics.

An advantage may provide for less processing time and power consumed. In other words, by omitting performing correlation operations for unrelated nodes, the system may conserve resources and provide results more quickly.

In an example, the network node of interest is application 161, which runs on top of VMs 160, 270, and 271. Correlation module 220 may receive set of related network nodes 212 (e.g., application 161, VMs 160, 270, and 271, and virtual volume 209) and summary data 214 (e.g., summarized data on application 161, VMs 160, 270, and 271, and virtual volume 209). Correlation module 220 applies correlation formula 222 to VM 162 and virtual volume 209, separately applies correlation formula 222 to VM 270 and virtual volume 209, and separately applies correlation formula 222 to VM 271 and virtual volume 209. In an example, the correlation score for VM 161 and virtual volume 209 is 30, the correlation score for VM 270 and virtual volume 209 is 50, and the correlation score for VM 271 and virtual volume 209 is 50. In an example, the correlation score of application 161 can be determined by applying a weighted average to the correlation scores of the closely related network nodes. In such an example, the correlation score of application 161 and virtual volume 209 is 43.3 (e.g., (30+50+30)/3).

Correlation module 220 determines a first list 224 including correlation scores between network nodes in the set of network nodes. First list 224 includes correlation scores for the set of network nodes (e.g., set of related network nodes 212) with respect to a given node of interest. It may be desirable to filter out those network nodes that do not have a high correlation to the given node of interest based on the correlation score. In an example, correlation module 220 sorts first list 224 such that the network nodes at the top of first list 224 have the highest correlation.

First filter module 230 obtains first list 224 and determines, based on the correlation scores, second list 232 including a first plurality of network nodes having a correlation score that satisfies a first threshold. In an example, if the correlation score exceeds the first threshold, the correlation score satisfies the first threshold. For instance, in one embodiment, the first threshold is a correlation score of 15 percent and first filter module 230 removes the correlation scores for network nodes having a correlation score that is less than 15 percent. First filter module 230 filters first list 224 by removing from first list 224 network nodes having a correlation score that does not satisfy the first threshold, thereby creating second list 232.

Although first filter module 230 has generated second list 232 such that it includes only network nodes having a correlation score that satisfies the first threshold, second list 232 may still have misleading information. For example, network nodes may show high performance correlations when in actuality their performance is not related. For instance, two network nodes both showing zero value for a metric (e.g., performance metric) over a long time period may show nearly one-hundred percent correlation, so it may be desirable to eliminate such suggestions to avoid providing useless information.

Second filter module 240 may filter the misleading entries out of second list 232. In an embodiment, second filter module 240 obtains second list 232 and identifies a second plurality of network nodes included in second list 232. In an example, the second plurality of network nodes has a correlation score that satisfies a second threshold, and the second threshold (e.g., 99 percent) indicates a correlation that is higher than the first threshold. Second filter module 240 analyzes the raw or summarized performance data of the second plurality of network nodes against a constancy metric. In an example, second filter module 240 determines, based on a constancy metric of the performance data, whether to remove ones of the nodes within the second plurality of network nodes.

The constancy metric may be determined by looking at the raw data. For example, second filter module 240 may be able to determine whether the correlation is high because the constancy within the raw data of some of the network nodes is high. For instance, a network node may be running at zero percent while another network node is running at one hundred percent without being meaningfully related. In such an example, the two network nodes may be at a steady operation, which may be indicated in the raw data by a lack of dips and spikes in the performance of the network node. In an example, second filter module 240 removes the second plurality of network nodes from second list 232 in response to determining that constancy values of each of the network nodes of the second plurality exceed a constancy threshold. Second filter module 240 removes, based on analyzing the raw data (e.g., performance data), the second plurality of network nodes from second list 232, thereby creating a third list 242. An example of a constancy metric includes a statistical formula quantifying the amount of variation in a performance metric over time, where lower variation results in a higher constancy.

Selector 246 obtains third list 242 and selects the top N correlation scores included in third list 242, where N is an integer equal to or greater than one. The selected N correlation scores may indicate the top N correlations in third list 242. For each of the N correlation scores, selector 246 may identify the plurality of network nodes having the respective correlation score and send the identified plurality of network nodes along with the applicable correlation score to a display engine 248. Display engine 248 may display identities for the plurality of network nodes and their respective correlation scores. Thus, in one example, an administrator is viewing a page for a given node of interest (e.g., an application running on one or more VMs). The administrator requests correlation information, and monitoring tool 117 performs the techniques described above to generate correlation data between the node of interest and each of its respective related nodes. The result is a list of a few other nodes (related nodes) and their correlation scores with respect to the node of interest, where those correlation scores were not filtered out. An example of a display is that shown and discussed in related provisional patent application 61/919,487.

Figure 3:
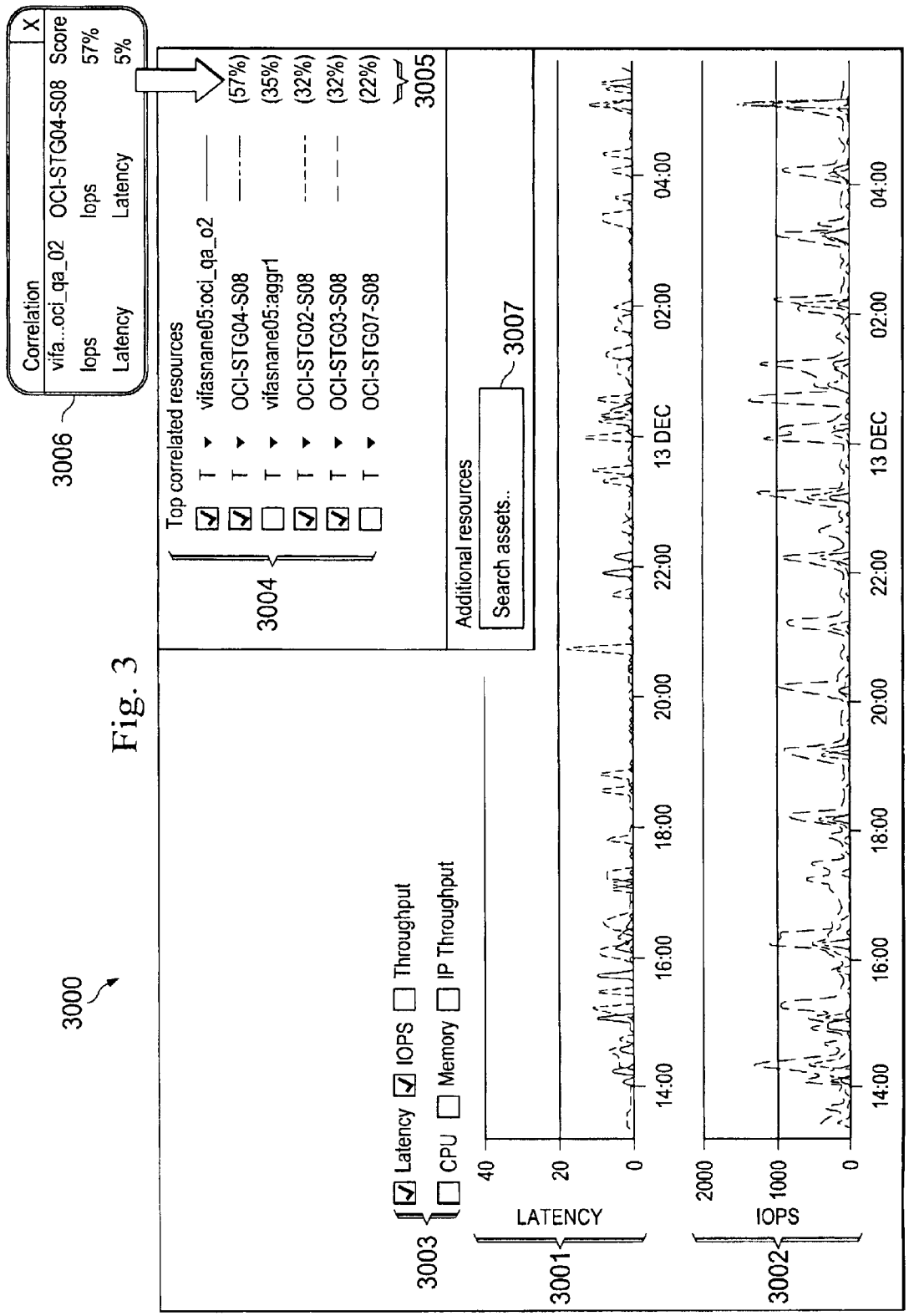
FIG. 3 is a simplified diagram of an example display of system performance information according to one embodiment.

FIG. 3 is a simplified diagram of an example display 3000 of system performance information according to one embodiment. FIG. 3 may be presented by a user interface on a display screen of a computing device to a human user. The underlying data analysis is performed by system monitoring tool 117 (FIG. 1). FIG. 3 shows a graphical display of performance information for multiple network nodes, providing the human user with intuitive, digestible information. Display 3000 includes a first graph 3001 and second graph 3002. First graph 3001 includes latency (in milliseconds) plotted on the y-axis against time on the x-axis, and second graph 3002 include IOPS on the y-axis against time on the x-axis. Display 3000 provides check boxes 3003 for a human user to select performance metrics to be displayed on the graphs and also provides a list of resources 3004, where each resource corresponds to a related node in a computer system. The resource at the top of list 3004 corresponds to a selected resource of interest (also referred to in this example as a "base resource"). The resources lower in the list 3004 are automatically selected by the system as related nodes using the techniques discussed above. The suggested nodes are listed underneath the base resource in the order of their respective correlation percentages with respect to the base resource.

As discussed above and further emphasized here, FIGS. 1-3 are merely examples which should not unduly limit the scope of the claims. One of ordinary skill in the art would recognize many variations, alternatives, and modifications.

Figure 4:
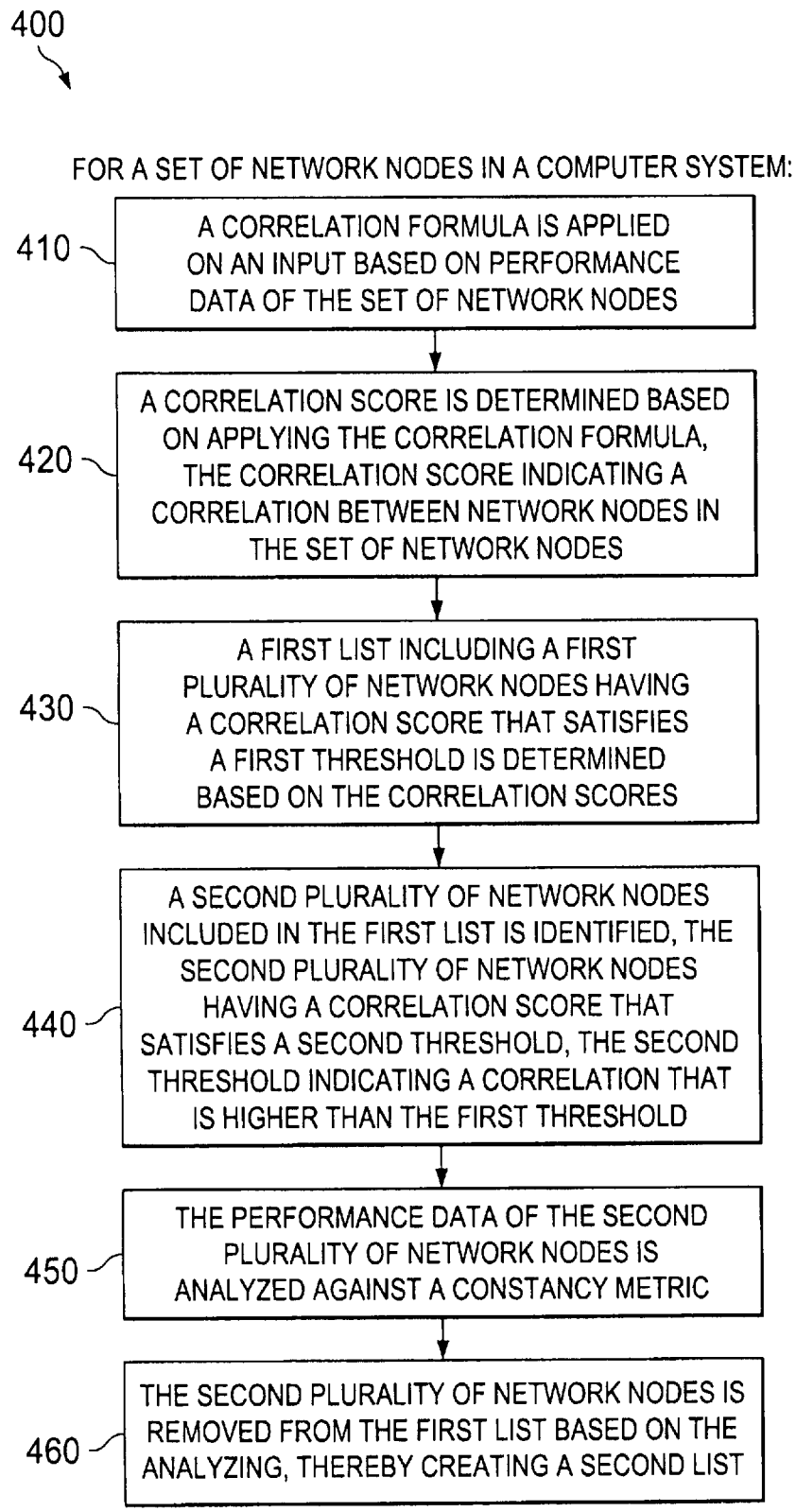
FIG. 4 is a simplified diagram of an example method of determining a correlation between network nodes in a computer system according to one embodiment.

FIG. 4 is a simplified diagram of an example method 400 of determining a correlation between network nodes in a computer system according to one embodiment. In some embodiments, one or more of the processes 410-460 of method 400 may be implemented, at least in part, in the form of executable code stored on non-transient, tangible, machine readable media that when run by one or more processors (e.g., a processor of server 110) may cause the one or more processors to perform one or more of the processes.

At a process 410, for a set of network nodes in a computer system, a correlation formula is applied on an input based on performance data of the set of network nodes. In an example, for a set of network nodes in a computer system correlation module 220 applies correlation formula 222 on an input based on performance data of the set of network nodes. At a process 420, for the set of network nodes in a computer system, a correlation score is determined based on applying the correlation formula, the correlation score indicating a correlation between network nodes in the set of network nodes. In an example, for the set of network nodes in the computer system, correlation module 220 determines a correlation score based on applying correlation formula 222, the correlation score indicating a correlation between network nodes in the set of network nodes. In one example, the correlation formula is applied to a set of related nodes with respect to a particular node of interest.

At process 430, a first list including a first plurality of network nodes having a correlation score that satisfies a first threshold is determined based on the correlation scores. In an example, first filter module 230 determines, based on the correlation scores, second list 232 including a plurality of network nodes having a correlation score that satisfies a first threshold. An example includes a first filter that eliminates entries having a correlation score that is assumed to be too low to be of use in troubleshooting. At a process 440, a second plurality of network nodes included in the first list is identified, the second plurality of network nodes having a correlation score that satisfies a second threshold, the second threshold indicating a correlation that is higher than the first threshold. In an example, second filter module 240 identifies a second plurality of network nodes included in second list 232, the second plurality of network nodes having a correlation score that satisfies a second threshold, the second threshold indicating a correlation that is higher than the first threshold.

At process 450, the performance data of the second plurality of network nodes is analyzed against a constancy metric. In an example, second filter module 240 analyzes the performance data of the second plurality of network nodes against a constancy metric. At process 460, the second plurality of network nodes is removed from the first list based on the analyzing, thereby creating a second list. In an example, second filter module 240 removes, based on the analyzing, the second plurality of network nodes from second list 232, thereby creating third list 246. An example includes a second filter that eliminates entries having high correlation scores due to high constancies. Process 450 may include removing ones of the nodes in the second plurality on an individual basis. Method 400 may also include displaying the results of the correlation calculation as in FIG. 3.

It should be noted that the examples above are given in the context of a network storage system, through the scope of embodiments is not so limited. Rather, the concepts described above may be implemented in any type of computing cluster, wherein performance data is sampled and analyzed. One example embodiment includes a cluster of server nodes, where performance data for the server nodes themselves, as well as for the applications running on the server nodes, is sampled according to a workload of each node or application. Process 400 would transfer the sampled data to an analysis application for further processing.

When implemented via computer-executable instructions, various elements of embodiments of the present disclosure are in essence the software code defining the operations of such various elements. The executable instructions or software code may be obtained from a non-transient, tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

In the embodiments described above, example clients 160, server 110, storage controllers 101 include processor-based devices and may include general-purpose processors or specially-adapted processors (e.g., an Application Specific Integrated Circuit). Such processor-based devices may include or otherwise access the non-transient, tangible, machine readable media to read and execute the code. By executing the code, the one or more processors perform the actions of the processes of FIG. 4.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of determining a correlation between network nodes in a computer system, comprising:
    for a set of network nodes in a computer system:
        applying a correlation formula on an input based on performance data of the set of network nodes; and
        determining a correlation score based on the applying a correlation formula, the correlation score indicating a correlation between network nodes in the set of network nodes;
    determining, based on the correlation scores, a first list including a first plurality of network nodes having a correlation score that satisfies a first threshold;
    identifying a second plurality of network nodes included in the first list, the second plurality of network nodes having a correlation score that satisfies a second threshold, the second threshold indicating a correlation that is higher than the first threshold;
    analyzing the performance data of the second plurality of network nodes against a constancy metric; and
    removing, based on the analyzing, the second plurality of network nodes from the first list, thereby creating a second list.

2. The method of claim 1, further including:
    determining a third list including correlation scores between network nodes in the set of network nodes; and
    identifying in the third list a third plurality of network nodes having a correlation score that does not satisfy the first threshold; and
    removing the third plurality of network nodes from the third list, thereby creating the first list.

3. The method of claim 1, wherein each network node comprises at least one of:
    a virtual volume, storage drive, storage controller, server, host machine, virtual machine, or an application.

4. The method of claim 1, further comprising generating the second plurality of network nodes by including topologically-related nodes and excluding nodes that are not topologically related.

5. The method of claim 1, further including:
    obtaining network topology data on the set of network nodes; and
    receiving the performance data based on one or more operations at the set of network nodes.

6. The method of claim 5, wherein receiving the performance data includes receiving raw data based on one or more operations at a first network node of the set of network nodes, the method further including:
    storing the raw data; and
    generating summary data for the first network node, the summary data being derived from the raw data, and the input including the summary data.

7. The method of claim 1, wherein for the set of network nodes including a first network node and a second network node, the applying a correlation formula determines a performance correlation between the first network node and the second network node.

8. The method of claim 7, wherein the first network node is of a first type and the second network node is of a second type, wherein the applying a correlation formula includes applying a first performance metric for the first network node of the first type and applying a second performance metric for the second network node of the second type.

9. The method of claim 8, wherein the first performance metric comprises at least one of:

a central processing unit (CPU) counter, I/O operations counter, port traffic, average I/O operations, or maximum I/O operations.

10. The method of claim 7, wherein the first network node is from a different vendor than the second network node.

11. The method of claim 1, further including:
selecting N correlation scores included in the second list, the selected N correlation scores indicating the highest N correlations in the second list; and
for each of the N correlation scores:
identifying a third plurality of network nodes having the respective correlation score; and
displaying the third plurality of network nodes and the respective correlation score.

12. The method of claim 1, wherein the analyzing the performance data includes:
removing the second plurality of network nodes from the first list in response to determining that constancy values of each of the network nodes of the second plurality exceed a constancy threshold.

13. The method of claim 1, wherein a first network node of the set of network nodes maintains a native performance counter, and a second network node of the set of network nodes does not maintain a native performance counter.

14. A system for determining a correlation between network nodes in a computer system, comprising:
a hardware processor for executing:
a correlation module that for a plurality of topologically related network nodes in a computer system, applies a correlation formula to performance data of the respective network nodes to calculate correlation scores for each of the network nodes, wherein each of the correlation scores indicates a correlation of performance data between two network nodes of the plurality of topologically related network nodes;
a first filter module that determines, based on the one or more correlation scores, a first list including a first subset of network nodes having a correlation score that satisfies a first threshold; and
a second filter module that identifies a second subset of network nodes included in the first subset and determines, based on a constancy metric of the performance data, whether to remove ones of the nodes within the second subset.

15. The system of claim 14, wherein the network topology data includes communication data on which network nodes communicate with ones of the network nodes, and wherein network nodes that communicate with each other are determined to be related to each other.

16. The system of claim 14, wherein the input is based on network topology data, the system further including:
a network topology extraction module that identifies, based on the network topology data, topologically-related network nodes.

17. The system of claim 14, wherein the correlation module determines a correlation between a first network node and a second network node of the set, and wherein the second network node does not maintain a native performance counter.

18. The system of claim 17, wherein the correlation module identifies a second plurality of network nodes that is closely related to the second network node, and wherein each network node of the second plurality of network nodes maintains a native performance counter.

19. The system of claim 18, wherein for each network node of the second plurality of network nodes, the correlation module determines a correlation score between the respective network node and the first network node and uses each of the correlation scores to calculate a correlation score for the application.

20. A computer program product having a non-transitory computer readable storage medium tangibly recording computer program logic for analyzing performance data of a computer system, the computer program product comprising:
code to, for each network node within a plurality of topologically-related network nodes in a computer system:
apply a correlation formula on performance data of a respective network node; and
determine a correlation score from the correlation formula, the correlation score indicating a correlation between the respective network node and another network node within the in the plurality of topologically-related network nodes;
code to determine, based on the correlation scores, a first list including a subset of network nodes having a correlation score that satisfies a first threshold;
code to identify a second subset of network nodes included in the first list and having a correlation score that satisfies a second threshold, the second threshold indicating a correlation that is higher than the first threshold;
code to determine, based on the performance data of the plurality of network nodes, whether to remove the second subset of network nodes from the first list; and
code to remove, based on the determining whether to remove, the second subset of network nodes from the first list, thereby generating a second list.

* * * * *